US012631425B2

(12) United States Patent
    Huber et al.

(10) Patent No.:    US 12,631,425 B2
(45) Date of Patent:        May 19, 2026

(54) HYBRID PAD SYSTEM

(71) Applicant: Northrop Grumman Systems Corporation, Falls Church, VA (US)

(72) Inventors: Michael S. Huber, Fairfield, CA (US); Zachary Hagan, Richmond, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 18/657,841

(22) Filed: May 8, 2024

(65) Prior Publication Data

US 2025/0347494 A1      Nov. 13, 2025

(51) Int. Cl.
    *F41F 3/052*      (2006.01)
    *B29C 45/17*      (2006.01)
    *B29C 45/26*      (2006.01)
    *B29L 31/00*      (2006.01)

(52) U.S. Cl.
    CPC .......... *F41F 3/052* (2013.01); *B29C 45/1742* (2013.01); *B29C 45/2602* (2013.01); *B29C 45/2616* (2013.01); *B29L 2031/777* (2013.01)

(58) Field of Classification Search
    CPC ....... F41F 3/052; F41F 3/073; B29C 45/1742; B29C 45/2616; B29C 2045/1784; B29L 2031/777; F16F 15/02
    See application file for complete search history.

(56) References Cited

U.S. PATENT DOCUMENTS

| | | | | | |
|---|---|---|---|---|---|
| 3,191,896 | A | * | 6/1965 | Nathan .................... | F16F 1/377 |
| | | | | | 248/633 |
| 4,118,019 | A | * | 10/1978 | Weir ........................ | F16F 1/376 |
| | | | | | 267/153 |
| 4,389,054 | A | * | 6/1983 | Lee .......................... | F41F 3/073 |
| | | | | | 277/916 |
| 4,406,211 | A | * | 9/1983 | Andersen ................ | F41F 3/073 |
| | | | | | 89/1.816 |
| 4,464,972 | A | * | 8/1984 | Simon ..................... | F41F 3/052 |
| | | | | | 89/1.816 |
| 4,604,940 | A | * | 8/1986 | Mendelsohn .......... | C08G 18/12 |
| | | | | | 528/65 |
| 4,627,327 | A | * | 12/1986 | Huber ..................... | F41F 3/052 |
| | | | | | 89/1.816 |
| 4,646,617 | A | * | 3/1987 | Robinson ................ | F41F 3/052 |
| | | | | | 89/1.816 |
| 4,734,329 | A | * | 3/1988 | Rudd ....................... | F42B 39/24 |
| | | | | | 89/1.816 |
| 4,739,691 | A | * | 4/1988 | Beutler ................... | F42B 39/24 |
| | | | | | 89/1.801 |
| 5,220,125 | A | * | 6/1993 | Huber ..................... | F41F 3/073 |
| | | | | | 89/1.816 |
| 5,353,677 | A | * | 10/1994 | Kennedy ................. | F41F 3/073 |
| | | | | | 89/1.816 |
| 5,438,906 | A | * | 8/1995 | Huber ..................... | F41F 3/073 |
| | | | | | 89/1.816 |

(Continued)

*Primary Examiner* — Benjamin P Lee
(74) *Attorney, Agent, or Firm* — Dority & Manning, P.A.

(57)        ABSTRACT

A hybrid pad system positioned between a missile and a launch tube is provided herein. The hybrid pad system includes an outer sheet and an inner sheet spaced from the outer sheet. A web region can be positioned between the outer sheet and the inner sheet. A restoration region can be positioned between the outer sheet and the inner sheet and tangentially offset from the web region. A support can be operably coupled with the inner sheet.

20 Claims, 14 Drawing Sheets

(56) References Cited

U.S. PATENT DOCUMENTS

| | | | | |
|---|---|---|---|---|
| 6,394,786 B1 * | 5/2002 | Hefner | .................... | B29C 45/40 |
| | | | | 425/441 |
| 6,619,669 B2 * | 9/2003 | Zhuo | ..................... | F16J 15/444 |
| | | | | 277/654 |
| 6,805,337 B1 * | 10/2004 | Rastegar | ................. | F16F 15/00 |
| | | | | 267/153 |
| 7,115,317 B2 * | 10/2006 | Zhuo | ......................... | B32B 5/26 |
| | | | | 428/116 |
| 2010/0102479 A1 * | 4/2010 | Walls | ..................... | B29C 43/36 |
| | | | | 264/255 |
| 2016/0236391 A1 * | 8/2016 | Franksson | ........... | B29C 45/7306 |
| 2016/0243739 A1 * | 8/2016 | Pauken | .................. | B29C 45/38 |
| 2017/0217059 A1 * | 8/2017 | Kunz | ................. | B29C 45/4005 |

* cited by examiner

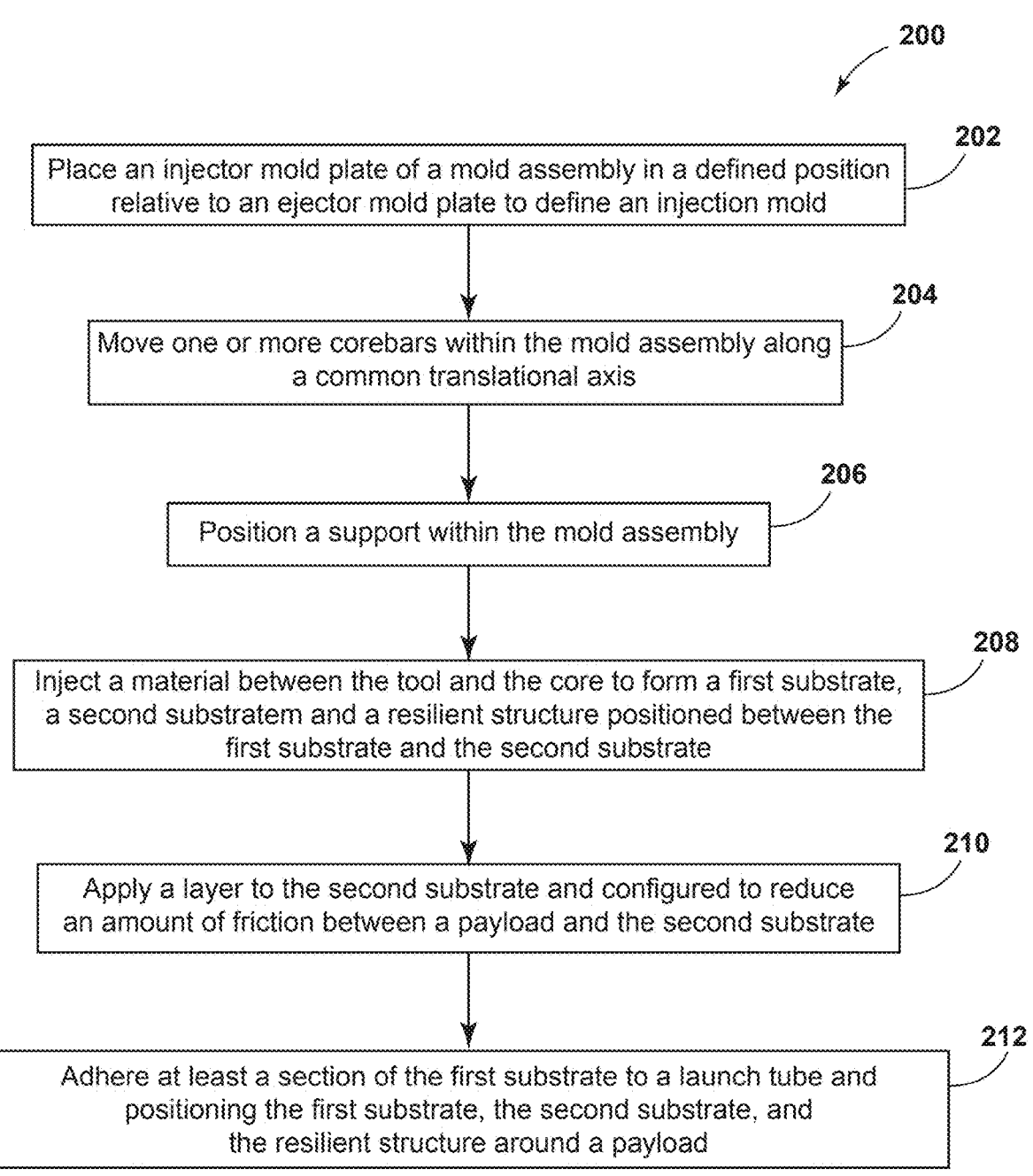

200

202

Place an injector mold plate of a mold assembly in a defined position relative to an ejector mold plate to define an injection mold

204

Move one or more corebars within the mold assembly along a common translational axis

206

Position a support within the mold assembly

208

Inject a material between the tool and the core to form a first substrate, a second substratem and a resilient structure positioned between the first substrate and the second substrate

210

Apply a layer to the second substrate and configured to reduce an amount of friction between a payload and the second substrate

212

Adhere at least a section of the first substrate to a launch tube and positioning the first substrate, the second substrate, and the resilient structure around a payload

FIG. 11

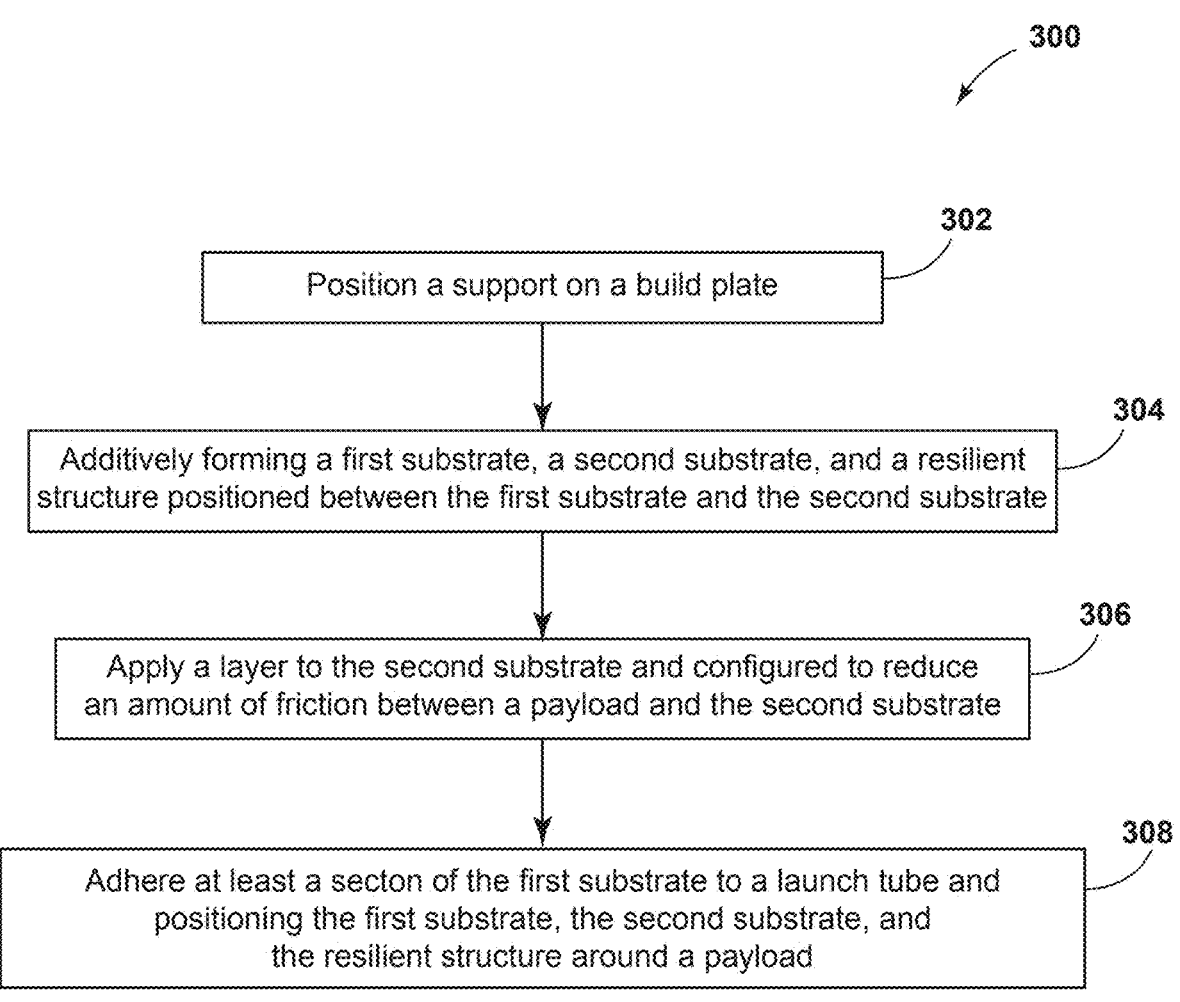

300

302

Position a support on a build plate

304

Additively forming a first substrate, a second substrate, and a resilient structure positioned between the first substrate and the second substrate

306

Apply a layer to the second substrate and configured to reduce an amount of friction between a payload and the second substrate

308

Adhere at least a secton of the first substrate to a launch tube and positioning the first substrate, the second substrate, and the resilient structure around a payload

FIG. 12

HYBRID PAD SYSTEM

FIELD

The present disclosure relates generally to a hybrid pad system, which may be in the form of a launch pad and/or a stowage pad, and more particularly to launch pads and stowage pads that may be utilized within missile launching systems to maintain missile alignment.

BACKGROUND

Launch pads and stowage pads may be used in missile launching systems to maintain missile alignment, mitigate shock and vibration, and/or provide lateral support to the missile during launch. In some instances, a plurality of pad units containing buckled (e.g., chevron-shaped) struts may be used to perform these functions. Due to the segmented nature of the pad units and the curved annular space, however, a desirable plateau characteristic is considerably diminished when the overall pad row (ring level) force/deflection characteristics are developed. Accordingly, an improved system and method would be welcomed in the technology.

BRIEF DESCRIPTION

Aspects and advantages of the present disclosure will be set forth in part in the following description, or may be obvious from the description, or may be learned through practice of the present disclosure.

According to some aspects of the present disclosure, a hybrid pad system positioned between a missile and a launch tube. The hybrid pad system includes an outer sheet and an inner sheet spaced from the outer sheet. A resilient structure is positioned between the outer sheet and the inner sheet. The resilient structure includes one or more web regions and one or more restoration regions.

According to some aspects of the present disclosure, a method of manufacturing a hybrid pad system includes placing an injector mold plate of a mold assembly in a defined position relative to an ejector mold plate to define an injection mold. The method also includes forming an outer sheet, an inner sheet, one or more web regions of a resilient structure, and one or more restoration regions of the resilient structure by injecting a material between the injector mold plate and the ejector mold plate.

According to some aspects of the present disclosure, a hybrid pad system positioned between a missile and a launch tube. The hybrid pad system includes an outer sheet and an inner sheet spaced from the outer sheet. A web region is positioned between the outer sheet and the inner sheet. A restoration region is positioned between the outer sheet and the inner sheet and tangentially offset from the web region. A support is operably coupled with the inner sheet.

These and other features, aspects, and advantages of the present disclosure will be further supported and described with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 11 illustrates a flow diagram for manufacturing a hybrid pad system in accordance with various aspects of the present disclosure; and FIG. 12 illustrates a flow diagram for manufacturing a hybrid pad system in accordance with various aspects of the present disclosure.

Figure 1:
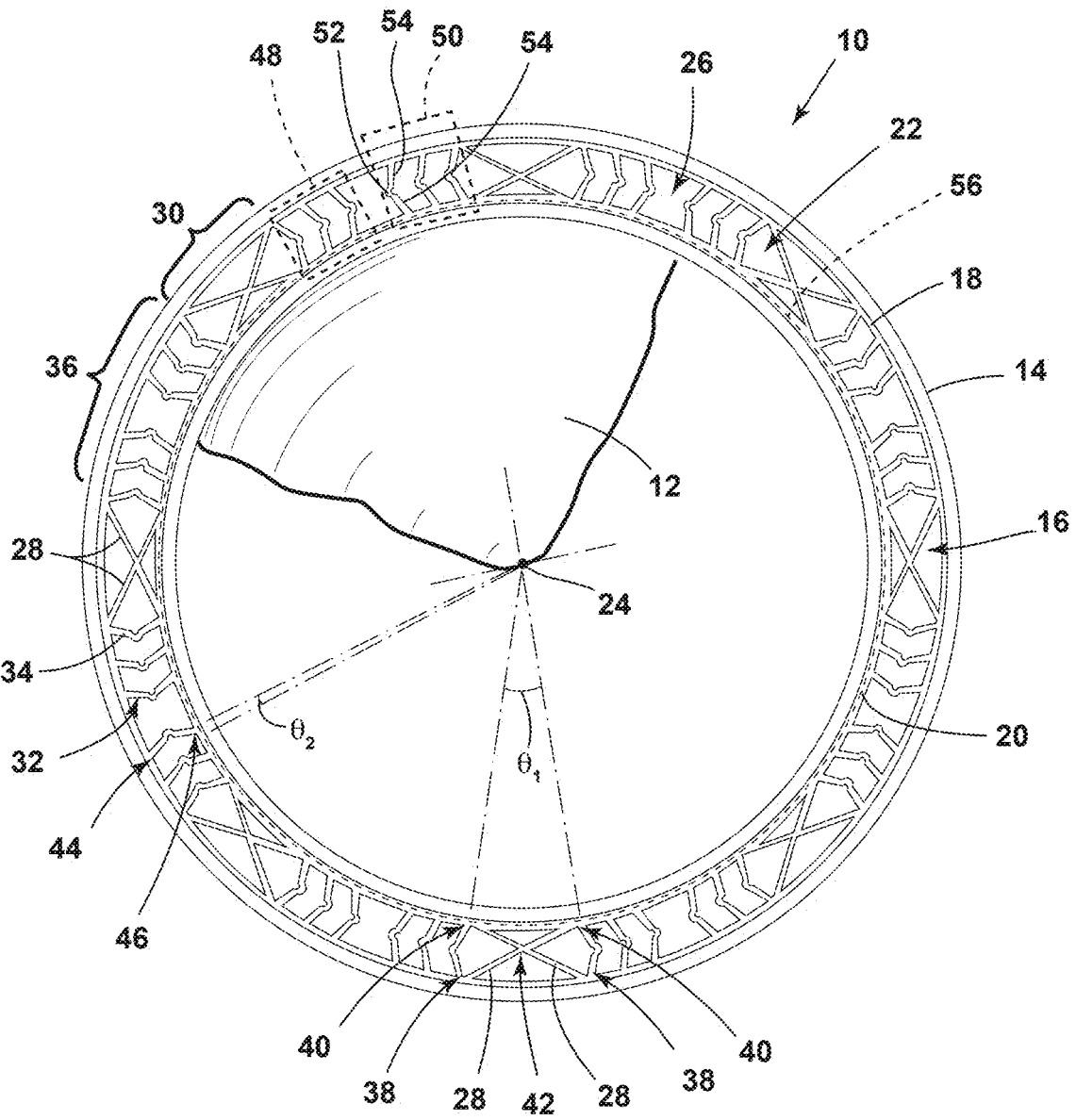
FIG. 1 illustrates a top plan view of a payload assembly that includes a payload, a surrounding housing separated from the payload, and a hybrid pad system in accordance with various aspects of the present disclosure.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The terms "coupled," "fixed," "attached to," and the like refer to both direct coupling, fixing, or attaching, as well as indirect coupling, fixing, or attaching through one or more intermediate components or features, unless otherwise specified herein. Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the disclosed functionality, and any two components capable of being so associated can also be viewed as being "operably couplable" to each other to achieve the disclosed functionality. Some examples of operably couplable include, but are not limited to, physically mateable, physically interacting components, wirelessly interactable, wirelessly interacting components, logically interacting, and/or logically interactable components.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a hybrid pad system that may be disposed between a payload (e.g., a missile) and a surrounding housing (e.g., a launch tube).

In some examples, the hybrid pad system can include an outer sheet and an inner sheet spaced from the outer sheet. A web region can be positioned between the outer sheet and the inner sheet. A restoration region can be positioned between the outer sheet and the inner sheet and tangentially offset from the web region. A support can be operably coupled with the inner sheet. In some cases, the support can be configured as a preformed material formed from at least one of a metallic material, an elastomeric material, a polymeric material, or a synthetic material. Additionally or alternatively, the support can be configured as a thicker region along the inner sheet compared to the one or more web elements. Moreover, the restoration regions and/or the web regions can be altered about the perimeter to attain defined restoring/damping responses in specific directions.

The hybrid pad system provided herein can increase the performance and/or reduce a manufacturing cost of the shock/stowage/launch pad system (also known as lateral support pads). Moreover, the hybrid pad system provided herein can increase a range of viable solutions to meet new and more challenging design constraints, such as increased shock mitigation, lower peak contact forces (such as highly local forces imposed on the payload skin by the hybrid pad system provided herein architecture), and greater cross-flow capability during launch. The design freedom offered by the ability to blend disparate elements within the stabilizing resilient structure can also enable a multi-function hybrid pad system that integrates additional functionality and performance.

Moreover, the hybrid pad system provided herein can combine some of the benefits of a sling-type pad with a compression-type pad to enable a broader range of design attributes to enhance the performance of the hybrid pad system used to isolate and protect payloads in undersea and surface launch launcher systems during storage, stowage, transportation, and/or launch. In some cases, the hybrid pad system utilizes elements of various other pad architectures but can reduce the number of tension webs so that a greater or lesser portion of the annular space can be occupied by buckled strut or other restoring elements that act on the hoop in a "by design" combination of compression, shear, and tensile force vectors.

The hybrid pad system provided herein can also be applied to any broadly similar shock isolation or cushioning application. The hybrid pad system architecture can combine the integrated support (e.g., hoop/belt architecture) and stabilizing tension webs of a sling pad with a buckled strut or other restoring elements to enable a stable, load-spreading hybrid pad system that maximizes performance compared to known solutions. The use of compression elements within the sling pad architecture generally allows a more rapid rise to a desired plateau pressure and provides increased tunability to achieve a desired force/deflection curve performance.

Referring now to FIG. 1, a payload assembly 10 can include a payload 12, a surrounding housing 14 separated from the payload 12 and configured to support the payload 12, and a hybrid pad system 16 positioned between the payload 12 and the surrounding housing 14. For instance, the payload 12 may be in the form of a missile, and the surrounding housing 14 may be in the form of a launch tube with the hybrid pad system 16 positioned between the launch tube and the missile. However, it will be appreciated that the hybrid pad system 16 provided herein may be used in any other manner without departing from the scope of the present disclosure.

Figure 2:
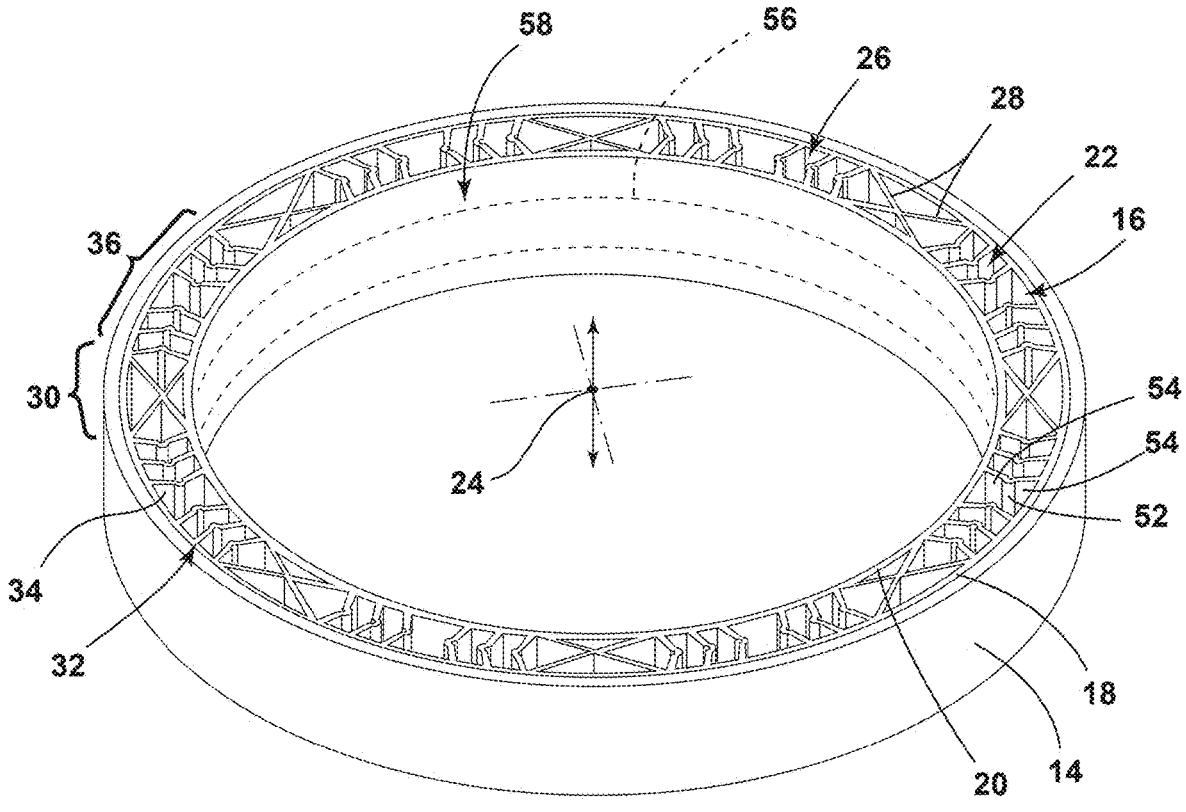
FIG. 2 illustrates a perspective view of the hybrid pad system in accordance with various aspects of the present disclosure.

As illustrated in FIGS. 1 and 2, the hybrid pad system 16 can include an outer sheet 18 and an inner sheet 20, which may be a cylinder, a truncated cylinder, or any other geometry. In some examples, the outer sheet 18 can define an outer perimeter portion of the hybrid pad system 16. In some cases, the outer region of the outer sheet 18 may be adhered to or otherwise coupled with surrounding housing 14, such as a launch tube. The inner sheet 20 can define an inner perimeter portion of the hybrid pad system 16. In various cases, the inner sheet 20 may contact the payload 12. For instance, the inner sheet 20 may be compressively retained, adhered to, or otherwise contact the payload 12. The outer sheet 18, the inner sheet 20, and/or the resilient structure 22 may be elastically deformable to maintain alignment of the missile within the launch tube, mitigate shock and vibration, and/or provide lateral support to the missile during launch and/or at any other time.

In examples in which the outer sheet 18 and the inner sheet 20 are cylindrical, the outer sheet 18 and the inner sheet 20 may be coaxial with one another about a common axis 24. In such instances, the inner sheet 20 may be separated from the outer sheet 18 to define a thickness of the resilient structure 22 therebetween. In some examples, such as the ones illustrated in FIGS. 1 and 2, the resilient structure 22 can include one or more structural elements 26. In some examples, the structural elements 26 can include one or more web elements 28 within a web region 30 that may provide both circumferential stability (e.g., prevent slewing) and/or a restoring force that acts through the inner sheet 20. Additionally or alternatively, the structural elements 26 can include one or more restoring elements 32, such as a buckled strut 34, within a restoration region 36. The web regions 30 and the restoration regions 36 may be interspersed with one another within the resilient structure 22. In various cases, a radial width of the web region 30 relative to the common axis 24 may be common or varied from a radial width of the restoration region 36 relative to the common axis 24. Moreover, a radial width of a first web region 30 relative to the common axis 24 may be common or varied from a radial width of a second web region 30 relative to the common axis 24. Likewise, a radial width of a first restoration region 36 relative to the common axis 24 may be common or varied from a radial width of a second restoration region 36 relative to the common axis 24.

In some examples, the web elements 28 may contact one or more of at least one additional web element 28, the outer sheet 18, and/or the inner sheet 20. For instance, one or more of the web elements 28 may be configured to be integrally formed and/or otherwise operably coupled with the outer sheet 18 at a first contact point 38 and the inner sheet 20 at a second contact point 40. In some cases, the first contact point 38 and the second contact point 40 may be circumferentially (or tangentially) offset from one another about the common axis 24 of the outer sheet 18 and the inner sheet 20 by a first tangential angle $\theta_1$. In addition, a first web element 28 may intersect a second web element 28 at an intersection point 42 that may be between the first contact point 38 and the second contact point 40. In some instances, the intersection point 42 can be generally tangent (or close to tangent) with a center section of the inner sheet 20 (slightly inboard in the depicted example). In addition, in various examples, the intersection point 42 may be a radial midpoint between the first contact point 38 and the second contact point 40. The web elements 28 may be configured to create an efficient hybrid pad system 16 that utilizes a web element length that can minimize and/or reduce peak strain for a defined stiffness and stroke.

In several examples, the restoring elements 32 may be configured as struts 34, such as buckled (e.g., chevron-shaped) struts, extending between the outer sheet 18 and the inner sheet 20. In various examples, one or more of the struts 34 may be configured to be integrally formed and/or otherwise operably coupled with the outer sheet 18 at a third contact point 44 and the inner sheet 20 at a fourth contact point 46. In some cases, the third contact point 44 and the fourth contact point 46 may be circumferentially (or tangentially) offset from one another about the common axis 24 of the outer sheet 18 and the inner sheet 20 by a second tangential angle $\theta_2$. In some cases, the second tangential angle $\theta_2$ may be zero (0) degrees. In several examples, the second tangential angle $\theta_2$ may be less than the first tangential angle $\theta_1$. However, it will be appreciated that the second tangential angle $\theta_2$ may be greater than or equal to the first tangential angle $\theta_1$ without departing from the teachings provided herein. In some cases, the buckled (e.g., chevron-shaped) struts 34 may be divided into two groups within each restoration region 36. In various examples, a first group 48 of one or more buckled struts 34 is oriented in a first direction, and a second group 50 of one or more buckled struts 34 is oriented in a second, opposing direction with a knee section 52 of the buckled struts 34 facing towards each other. In some instances, a distance between the first group 48 and the second group 50 may be greater than a distance between a first strut 34 and a second strut 34 within at least one of the first group 48 or the second group 50.

In various examples, the knee section 52 can be positioned between a pair of opposing leg sections 54. In some cases, the knee section 52 can be configured to further control a bending movement of the strut 34 when force is applied thereto. For instance, the knee section 52 may have a semicircular shape to encourage the bending movement of the knee section 52 in a defined manner, which may occur before the bending movement of the opposing leg sections 54. In various examples, first and second hinges may be defined where the leg sections transition into the outer sheet 18 and the inner sheet 20. In several examples, the knee sections may be radially offset in an inboard and/or outboard manner (e.g., offset from a center location between the outer sheet 18 and the inner sheet 20).

Moreover, in various examples, each of the struts may define a strut angle between the opposing leg sections 54 of each strut 34. It will be appreciated that the strut angle, a thickness of the inboard leg section compared to an outboard leg section, and/or a location of the knee section may be modified based on the various design constraints. Each of these modifications is possible as the struts 34 described herein can operate in a circumferentially larger system, and operate in a broader displacement space (e.g., the struts 34 can be compressed, sheared, and put in tension). Thus, the hybrid pad system 16 provided herein offers tuning capability.

In some instances, the pressure deflection curves of the chevron strut design can be characterized as initially pressure rises sharply from small deflections, then the pressure remains generally constant for an appreciable amount of deflection, and finally as the struts 34 begin to fall flat or bottom out the pressure rises sharply with small deflections. Thus, the force/deflection characteristics of these struts 34 have a defined characteristic plateau which allows a determined amount of lateral excursion at a relatively constant force. In some cases, the constant force may be a maximum permitted payload skin load in the case of a missile launcher.

In various examples, the hybrid pad system 16 may include a support 56. For example, the support 56 may be operably coupled with the outer sheet 18, the inner sheet 20, and/or the resilient structure 22 of the hybrid pad system 16 and may extend approximately an axial height of a perimeter of the inner sheet 20. In some examples, the support 56 may be configured as an inner hoop that is operably coupled with the inner sheet 20, such as by embedding the support 56 within the inner sheet 20. In some cases, the support 56 may be operably coupled (directly or indirectly) with the outer sheet 18, the inner sheet 20, and the resilient structure 22 that, in combination, work largely in tension. In various examples, the hybrid pad system 16 may be free of a support 56 based on the payload assembly configuration, with the outer sheet 18, the inner sheet 20, and/or the resilient structure 22 providing a sufficient strength/modulus to support the payload 12. In some instances, an undersea-based payload assembly 10 may include the support while a surface launch payload assembly 10, where the hybrid pad system 16 is configured to fly out with the payload 12 and is discarded may include the support 56. Moreover, the payload assembly may include any number of hybrid pad systems 16 without departing from the teachings provided herein. Further, in various examples, the support 56 may be positioned within and/or otherwise operably coupled with any other component of the hybrid pad system 16. For example, the support 56 may be positioned within and/or otherwise operably coupled with the outer sheet 18 and/or any other component. The hybrid pad system 16 provided herein can increase a hybrid pad system footprint on the payload 12 and engage more of the hybrid pad system material to resist deflection and generate net restoring force. These attributes can lower peak contact forces on the payload 12 and decrease peak and average strains in the hybrid pad system 16.

It will be appreciated that the support size, material, and modulus can be altered to fine-tune the hybrid pad system force/deflection curves. The ability to add various supports with the tension resilient structure 22, along with the ability to alter various parts of the hybrid pad system 16 can increase the range of viable hybrid pad system materials (resulting from lower peak strains and simplified mold architecture), which, in turn, can expand the viable design space.

In some instances, the support 56 may have a higher tensile modulus (or a lower tensile modulus) than the inner sheet 20, which may be accomplished by forming a thicker region along the inner sheet 20 compared to the one or more web elements 28 and/or operably coupling an additional component (any structure that is continuous or non-continuous and formed from a material that is varied from the material forming the inner sheet 20) to the inner sheet 20. In instances in which the support 56 is an additional component, the support 56 may be insert-molded with the outer sheet 18, the inner sheet 20, and/or the resilient structure 22. Additionally or alternatively, the support 56 may be later attached or otherwise coupled with the outer sheet 18, the inner sheet 20, and/or the resilient structure 22. In various examples, the support 56, which may be in tension, is generally slightly larger than a perimeter of the payload 12 and, thus, applies a sling load to an arc, which may be 180 degrees or more of the perimeter of the payload 12 on a compression side with the sling load being created by the sum of the compression, shear, and tension loads generated within the resilient structure 22. In some cases, a slight excess circumference of the supports may end up on a tension side, thus the inner sheet 20 may deform from a cylinder to an egg shape (or any other shape) as displacement increases, and a separation region 66 may be created on the tension side.

In various examples, such as the example of FIG. 2, the hybrid pad system 16 can retain a tensile hoop of the inner sheet 20, which can combine with the tension webs to prevent slewing within the hybrid pad system 16 and reduce contact pressure on the payload 12. Moreover, the hybrid pad system 16 can retain a percentage of a sling pad tension webs for stability and load-spreading while the restoring elements 32, such as buckled struts 34, can improve initial stiffness compared to a sling pad. Moreover, the percentage of web elements 28 versus other restoring elements 32 can be a tunable feature based on the design constraints of the hybrid pad system 16. Furthermore, the support 56 can unite the hybrid pad system 16 circumferentially so that each of the web elements 28 and the restoring elements 32 can provide a restoring force when a force is applied to the payload 12.

In various examples, the inner sheet 20 and/or the support 56 can bear against the payload 12. As such, the inner sheet 20 and/or the support 56 can include a layer 58 thereon that is configured to reduce an amount of friction between the payload 12 and the inner sheet 20 and/or the support 56. For instance, the layer 58 may include a polytetrafluoroethylene material, and/or any other material. In some instances, the layer 58 may be configured to exhibit nonstick, waterproof, noncorrosive, and/or nonreactive characteristics. In some cases, the hybrid pad system 16 may experience quality check and/or other testing before end usage within the payload assembly 10. Due to the deformation characteristics exhibited by the hybrid pad system 16 provided herein, the layer 58 may have less degradation during quality assurance (QA) testing and operation when compared to legacy pad systems that include a layer 58 thereon.

In several examples, the hybrid pad system 16, or portions thereof, can be formed from an energy-absorbing material that behaves in a rate-independent hyperelastic manner wherein its permanent set is minimized so that the energy-absorbing material maintains consistent force-displacement characteristics over a wide range of displacements while remaining substantially fully recoverable. Hyperelastic materials have the ability to do work by absorbing kinetic energy transferred from impact through an elastic deformation with little viscous damping, heat dissipation (from friction forces), or permanent deformation (i.e., permanent set). This mechanical energy can then be returned to nearly its original shape (e.g., about 100%) allowing the components to return to their original configuration before impact with negligible strain.

Further, the hyperelastic material can behave in a hyperelastic manner under dynamic loadings of high strain rates of up to at least 900-1000 s $1$. The hyperelastic material can allow for movement of the payload 12 relative to the surrounding housing 14 and also allow for the recovery of the hybrid pad system 16 to its original geometry, or a generally similar geometry in which the deformation is maintained below a defined threshold (e.g., 10%). The hyperelastic material can have non-linear elastic responses when deformed from its original geometry. It will be appreciated that the hyperelastic material may be in the form of a thermosetting or thermoplastic urethane, and/or any other practicable material that can exhibit elastic, superelastic, or hyperstatic characteristics.

In various examples, the hybrid pad system 16 provided herein may generate a generally uniform loading on the payload 12. However, in some cases, the hybrid pad system 16 may create more of a rising rate force/deflection curve rather than a ramp-plateau characteristic. In some instances, this characteristic may be improved by creating a pad system 16 that can be pre-loaded during installation. In such instances, the hybrid pad system 16 may be cast/fabricated in two parts. For instance, a first part may include the outer sheet 18 while the second part includes the remaining components of the hybrid pad system 16, which can include the inner sheet 20 and/or the resilient structure 22. Moreover, in several examples, the second part may be cast, molded, and/or additively manufactured such that the resilient structure 22 may have a non-stretched length that is less than a default distance between the outer sheet 18 and the inner sheet 20. In such instances, the resilient structure 22 may be stretched from its default length to attach (by any number of methods) to the outer sheet 18 so that tension is generated in the resilient structure 22 upon installation. Accordingly, the resilient structure 22 may be pre-stretched so that the resilient structure 22 may act to create a quicker ramp up of the force/deflection curve of the hybrid pad system 16 when displaced and create a plateau by transitioning into the hyper-elastic material zone as displacement increases.

In some cases, the hybrid pad system 16, or portions thereof, may be formed by staging a casting to partially fill a mold, then re-arrange or introduce new mold sections, then complete the casting. For instance, as provided herein, the hybrid pad system 16 may be cast from thermosetting elastomers, as these materials are well-vetted for various launcher requirements. One of the characteristics of these materials is that they are cast and then go through various post-casting processes, such as initial cure before demolding, then additional curing over some sort of time/temperature schedule. As such, by utilizing a secondary "staged" casting within a short time window, the resultant casting of the hybrid pad system 16 may be robust, as if it were all cast at once.

Figure 3A:
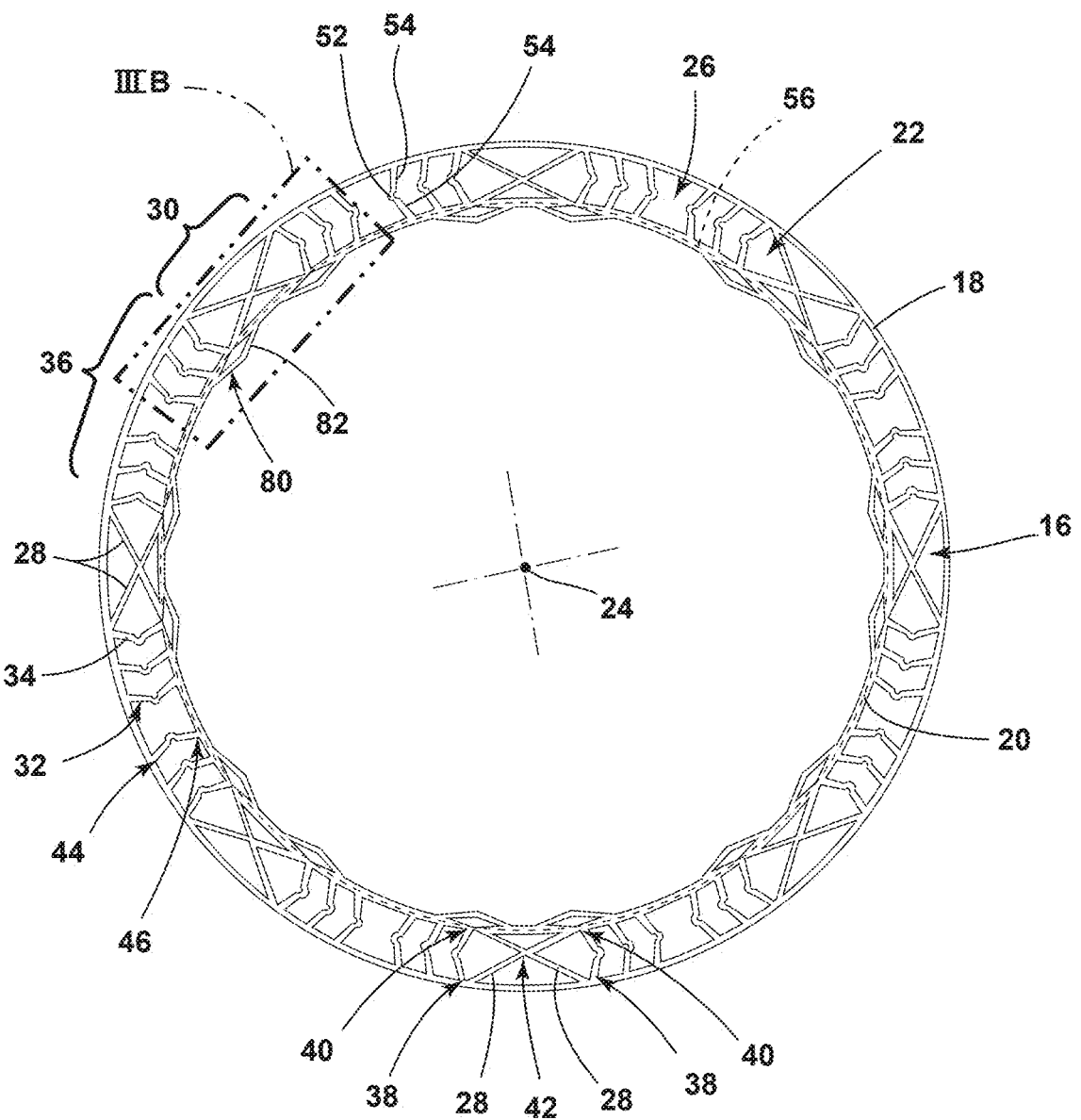
FIG. 3A illustrates a top plan view of the hybrid pad system in accordance with various aspects of the present disclosure.
Figure 3B:
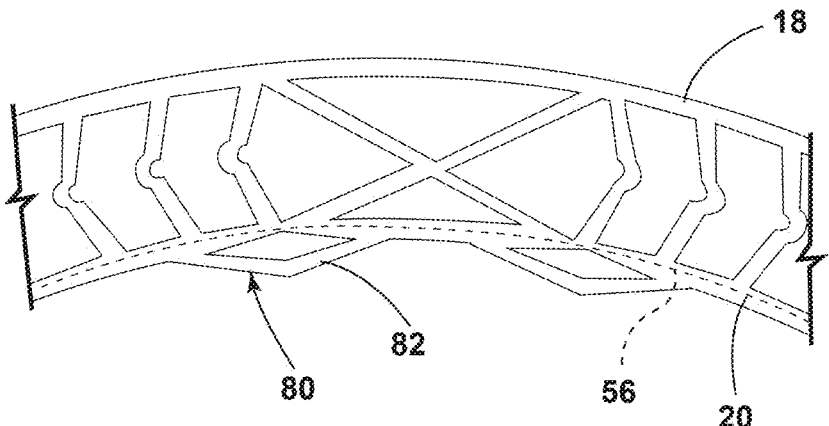
FIG. 3B illustrated an enhanced view of section IIIB of FIG. 3A.

Referring now to FIGS. 3A and 3B, in some cases, the hybrid pad system 16 may include a tolerance region 80 that may be operably coupled with and/or integrally formed with the outer sheet 18, the inner sheet 20, and/or any other component of the hybrid pad system 16. At times, a certain amount of tolerance build-up between the payload 12 and the hybrid pad system 16 and/or the hybrid pad system 16 and the surrounding housing 14 may tend to loosen a mating relationship between the various components of the payload assembly 10. The tolerance region 80 may compensate for this extra tolerance and/or increase the gripping force of the hybrid pad system 16 to the payload 12 and/or the surrounding housing 14. As shown, the tolerance region 80 can include extensions 82 that can extend inwardly (towards the common axis 24) from the inner sheet 20. Additionally or alternatively, the tolerance region 80 can include extensions 82 that can extend outwardly (away from the common axis 24) from the outer sheet 18. In various examples, the tolerance region 80 may be configured to not add extra thickness to the fully compressed stack-up of the hybrid pad system 16. In such examples, the tolerance region 80 may be configured as "ripples" or "corrugations" in the inner sheet 20 rather than features that combine to add thickness to the inner sheet 20 and thus to the fully compressed stack height. It will be appreciated that, in some instances, the tolerance region 80 may also generally allow the support 56 to be slightly larger than the diameter of the payload 12. Such a configuration may avoid high encapsulation forces or friction loads while still allowing the hybrid pad system 16 to act in a sling-like manner. Additionally or alternatively, the tolerance region 80 may be configured as "ripples" or "corrugations" in the outer sheet 18 rather than features that combine to add thickness to the outer sheet 18.

Figure 4:
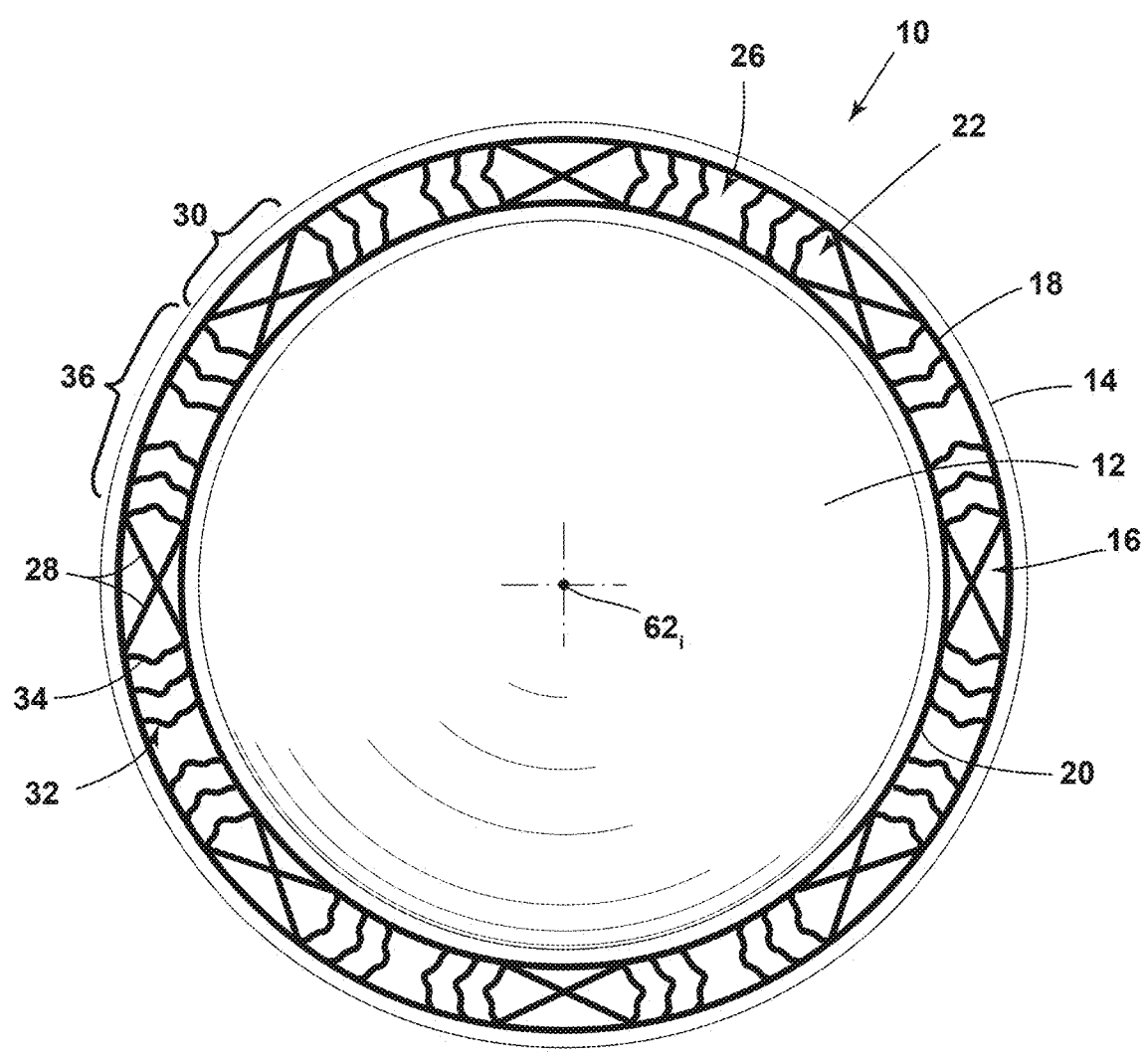
FIGS. 4-6 illustrates a top view of the payload assembly experiencing various displacements in accordance with various aspects of the present disclosure.
Figure 5:
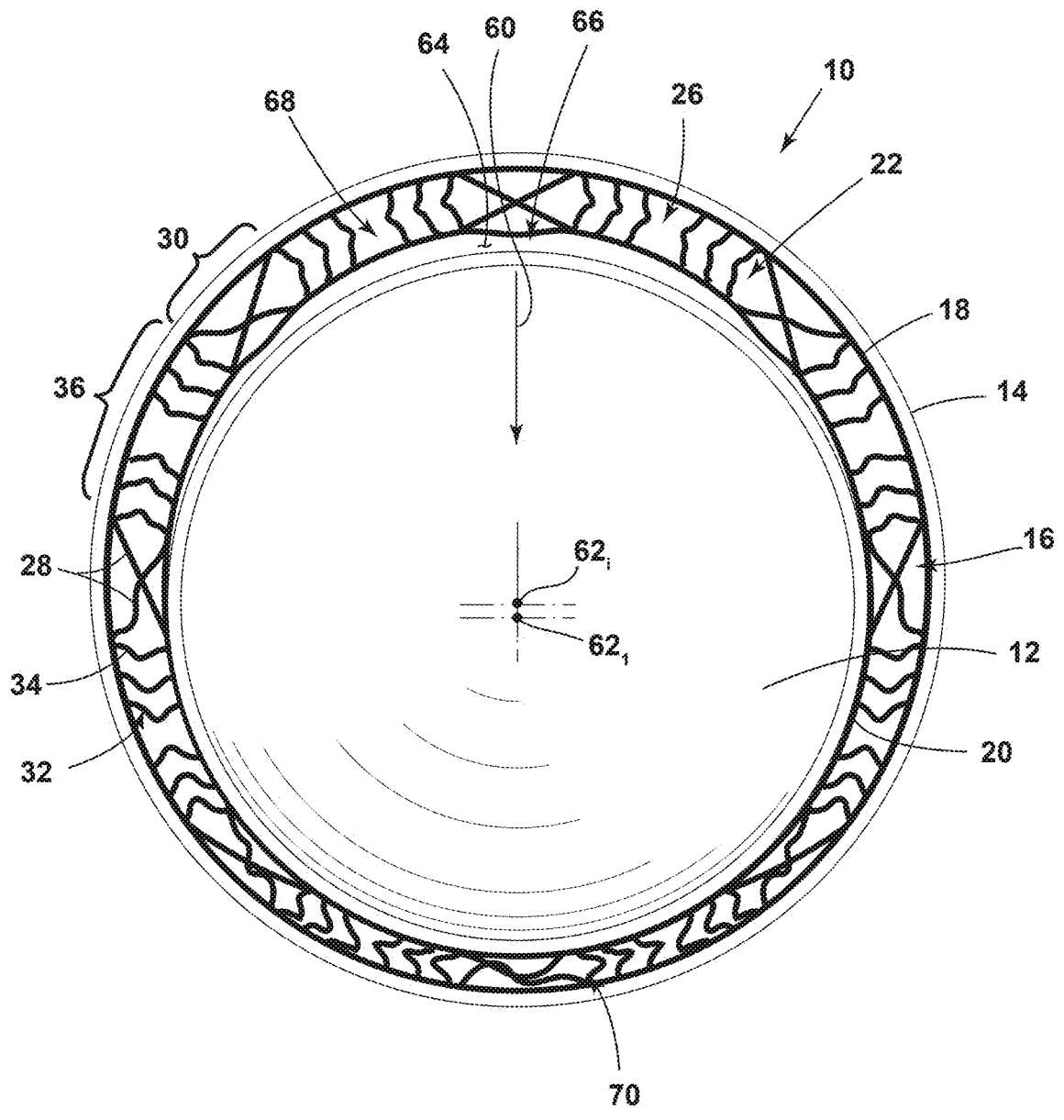
Figure 6:
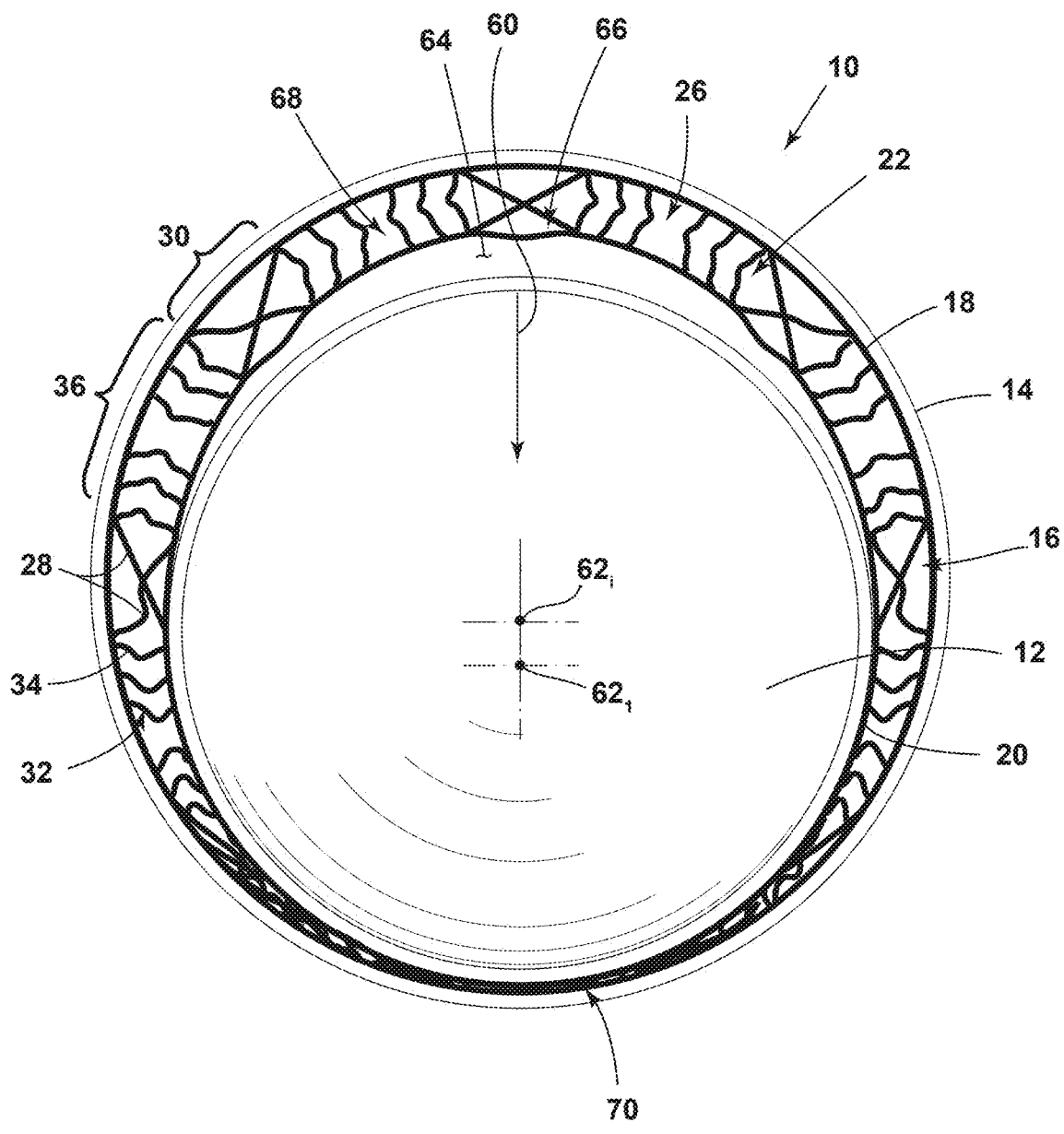

Referring now to FIGS. 4-6, a displacement (illustrated by arrow 60 in FIGS. 5 and 6) of the payload 12 and the hybrid pad system 16 within the surrounding housing 14 is shown. Specifically, FIG. 4 illustrates the payload 12 and the hybrid pad system 16 within the surrounding housing 14 before the payload 12 experiences the displacement with the initial axis labeled as $62_i$. FIG. 5 illustrates the payload 12 and the hybrid pad system 16 within the surrounding housing 14 with a displacement of the payload 12 at a first displacement with the initial axis of the payload 12 labeled as $62_i$ and the payload axis at the first displacement labeled as $62_1$. FIG. 6 illustrates the payload 12 and the hybrid pad system 16 within the surrounding housing 14 with the displacement of the payload 12 displaced at a second displacement that is greater than the first displacement with the initial axis of the payload 12 labeled as $62_i$ and the payload axis at the second displacement labeled as $62_2$. The arrow 60 indicates the direction of the displacement of the payload 12.

In the examples illustrated in FIGS. 4-6, the outer sheet 18 may be at least partially adhered to or otherwise coupled with a surrounding housing 14. As the payload 12 is displaced, the components of the hybrid pad system 16 may deform causing a separation distance 64 is defined between the payload 12 and a separation region 66 of the hybrid pad system 16 as one or more components of the hybrid pad system 16 are deformed. In general, the separation region 66 can be controlled by the modulus of the support 56 and the relative stiffness of the support 56 that may be embedded and/or attached to the inner sheet 20 compared to the cumulative tension/shear forces being generated by the resilient structure 22. For example, a first segment 68 of the resilient structure 22 is extended, and a second segment 70 of the resilient structure 22 is compressed when the payload 12 is displaced, which are indicated by the deformation from the initial shape, as shown in FIG. 4, of the tension elements. In addition, the support 56 can transfer tension within the resilient structure 22 into a uniform sling load in a compression zone. In some instances, the support 56 may reduce the separation distance 64 by distributing the load along the circumference of the hybrid pad system 16.

In response to the deformation of the hybrid pad system 16, the resilient structure 22 positioned between the outer sheet 18 and the inner sheet 20 can work in compression and tension to resist deflection of the payload 12 and generate a net restoring force. In some cases, these attributes can dramatically lower peak contact forces on the payload 12 and decrease peak and average strains in the hybrid pad system 16. As provided herein, the amount of restorative force generated by the hybrid pad system 16 can differ based on the materials used to form the hybrid pad system 16, the resilient structure 22, the thickness of the outer sheet 18, and the thickness of the inner sheet 20, among other factors.

Figure 7:
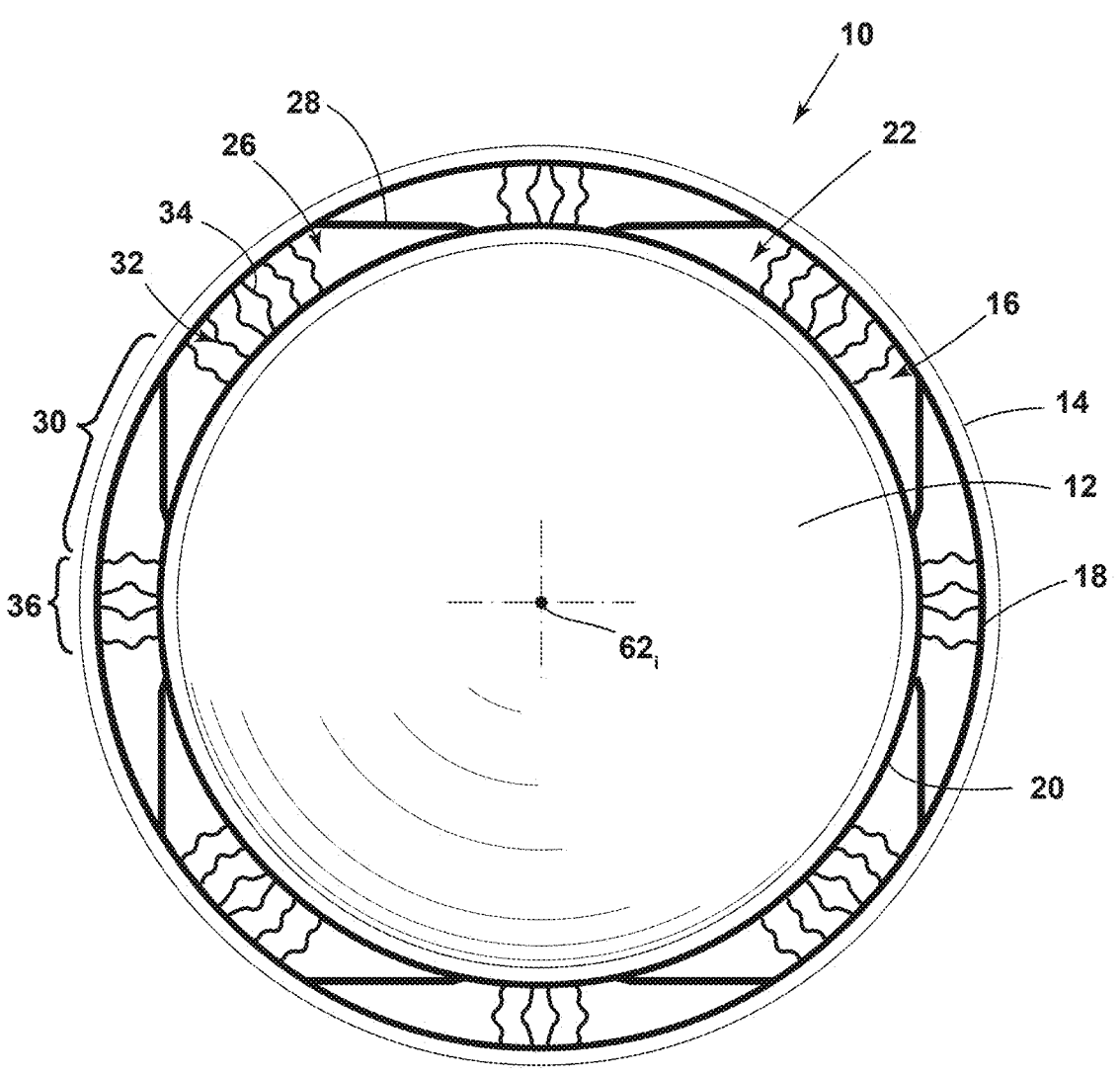
FIGS. 7-9 illustrates a top view of the payload assembly experiencing various displacements in accordance with various aspects of the present disclosure.
Figure 8:
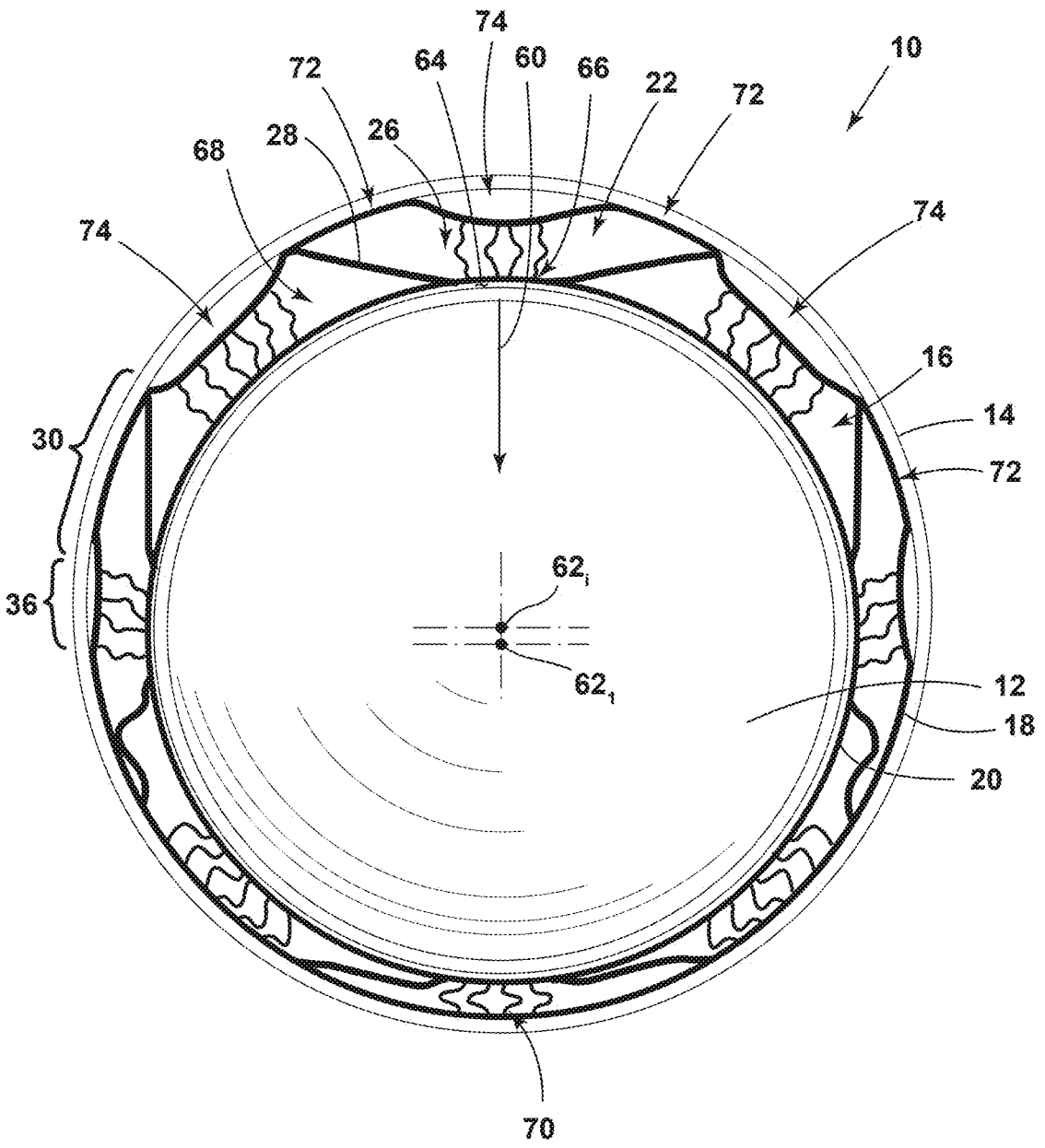
Figure 9:
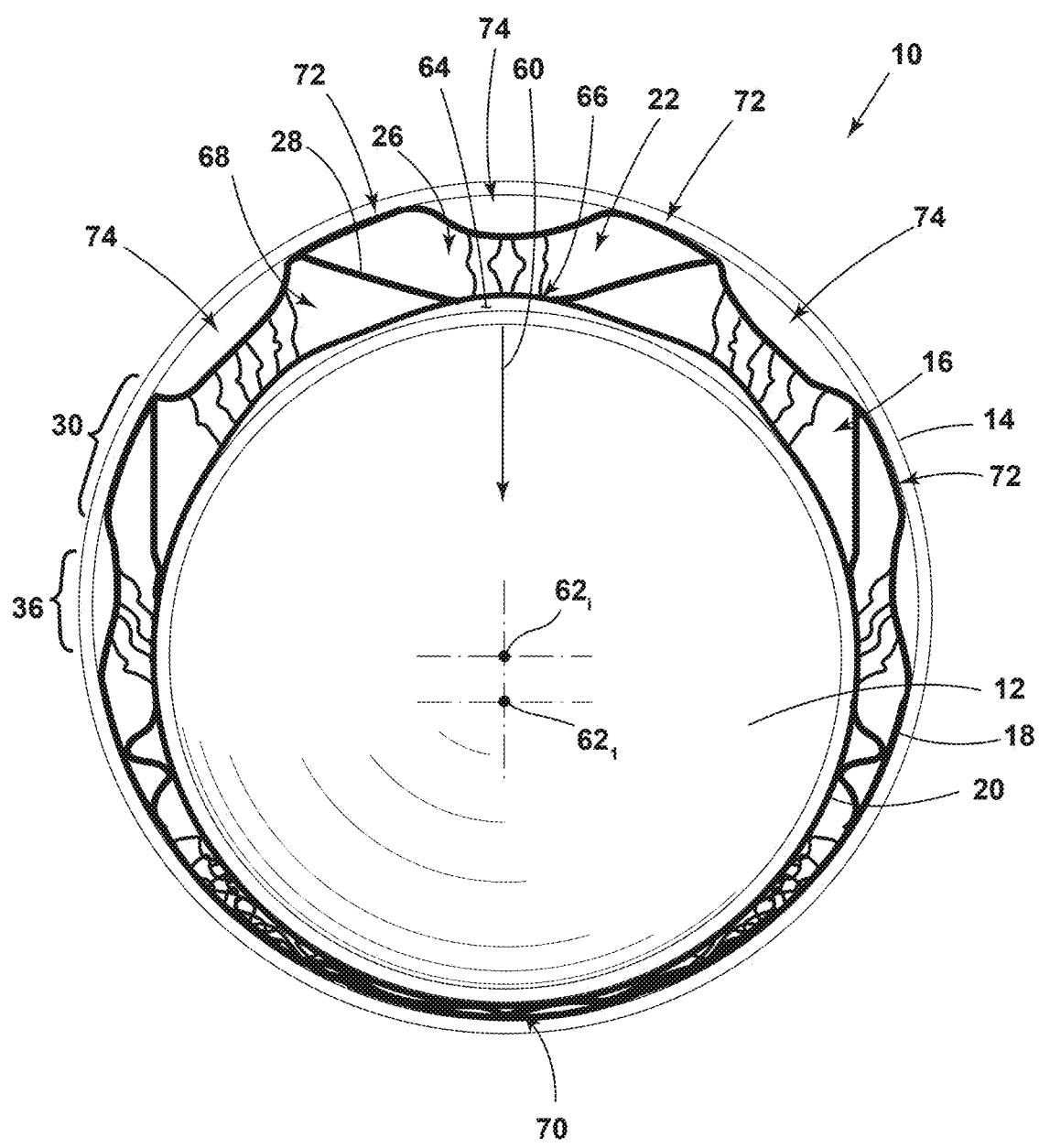

Referring now to FIGS. 7-9, a displacement (illustrated by arrow 60 in FIGS. 8 and 9) of the payload 12 and the hybrid pad system 16 within the surrounding housing 14 is shown. Specifically, FIG. 7 illustrates the payload 12 and the hybrid pad system 16 within the surrounding housing 14 before the initiation of the displacement having an initial axis of the payload 12 labeled as $62_i$. FIG. 8 illustrates the payload 12 and the hybrid pad system 16 within the surrounding housing 14 with the displacement at a first displacement with the initial axis of the payload 12 labeled as $62_i$ and the payload axis at the first displacement labeled as $62_1$. FIG. 9 illustrates the payload 12 and the hybrid pad system 16 within the surrounding housing 14 with the displacement at a second displacement that is greater than the first displacement with the initial axis of the payload 12 labeled as $62_i$ and the payload axis at the second displacement labeled as $62_2$. An arrow 60 indicates the direction of the force being applied to the payload 12.

In some examples, such as the one illustrated in FIGS. 7-9, the resilient structure 22 can include a respective web element 28 that can form a tension web within each respective web region 30 and/or one or more restoring elements 32 (such as the struts 34 described herein) within each respective restoration region 36. As illustrated, a first restoration region 36 can include a first set of a defined number (e.g., one or more) of struts 34 and a second restoration region 36 can include a second set of a defined number (e.g., one or more) of struts 34, which may be varied or common with the first set of struts 34. In various examples, the knee sections 52 of the struts 34 within the first set of struts 34 and/or the second set of struts 34 can be configured to face towards each other, away from each other, and/or in any other direction.

In the example shown in FIGS. 7-9, the outer sheet 18 may be at least partially adhered to or otherwise coupled with a surrounding housing 14. For instance, the outer sheet 18 may define attached sections 72 in which the outer sheet 18 and the surrounding housing 14 are adhered or otherwise attached to one another. In some instances, the attached sections 72 may be generally aligned with the web regions 30 of the resilient structure 22. In addition, the outer sheet 18 may define unattached sections 74 in which the outer sheet 18 and the surrounding housing 14 are not adhered to or otherwise attached to one another. In some instances, the unattached sections 74 may generally be aligned with the restoration regions 36 of the resilient structure 22. In some cases, by having intermittent attached sections 72 and unattached sections 74, the use of a high modulus support and stiff compressive elements may be utilized while minimizing peak strains that would otherwise occur with straightening and stretching of the buckled struts 34. Additionally or alternatively, in various examples, straightening the struts 34 may not produce a desired ramp-plateau characteristic, so if there is too much strut straightening the overall force/deflection curve of the hybrid pad system 16 strays from the desired ramp-plateau behavior.

In the examples shown in FIGS. 7-9, as the payload 12 is displaced, the components of the hybrid pad system 16 may deform causing a separation distance 64 is defined between the payload 12 and a separation region 66 of the hybrid pad system 16 as one or more components of the hybrid pad system 16 are deformed. For example, a first segment 68 of the resilient structure 22 is extended, and a second segment 70 of the resilient structure 22 is compressed when the payload 12 is displaced. In addition, the support 56 can transfer tension within the resilient structure 22 into a uniform sling load in a compression zone. In some instances, the support 56 may reduce the separation distance 64 by distributing the load along the circumference of the hybrid pad system 16. Further, in some cases, the unattached sections 74 of the hybrid pad system 16 can deform and create an additional separation space.

In response to the deformation of the hybrid pad system 16, the hybrid pad system 16 can provide a collection of restoring web elements 28 in the form of the resilient structure 22 positioned between the outer sheet 18 and the inner sheet 20 that can work in tension to provide stability against slewing, resist deflection of the payload 12 and/or generate a net restoring force. In some cases, these attributes can dramatically lower peak contact forces on the payload 12 and decrease peak and average strains in the hybrid pad system 16. As provided herein, the amount of restorative force generated by the hybrid pad system 16 can differ based on the materials used to form the hybrid pad system 16, the resilient structure 22, the thickness of the outer sheet 18, and the thickness of the inner sheet 20, among other factors.

Moreover, in some cases, the deformation may cause various components to deform from its non-displaced geometry. For instance, as the separation distance increases, the shear and tension portions of the resilient structure 22 may resist deformation, and thus, deform or stretch the inner sheet 20 (with or without the support 56) into a slight egg shape that creates tension in the lateral regions of defines the inner sheet with respect to the orientation shown in FIGS. 7-9.

Figure 10A:
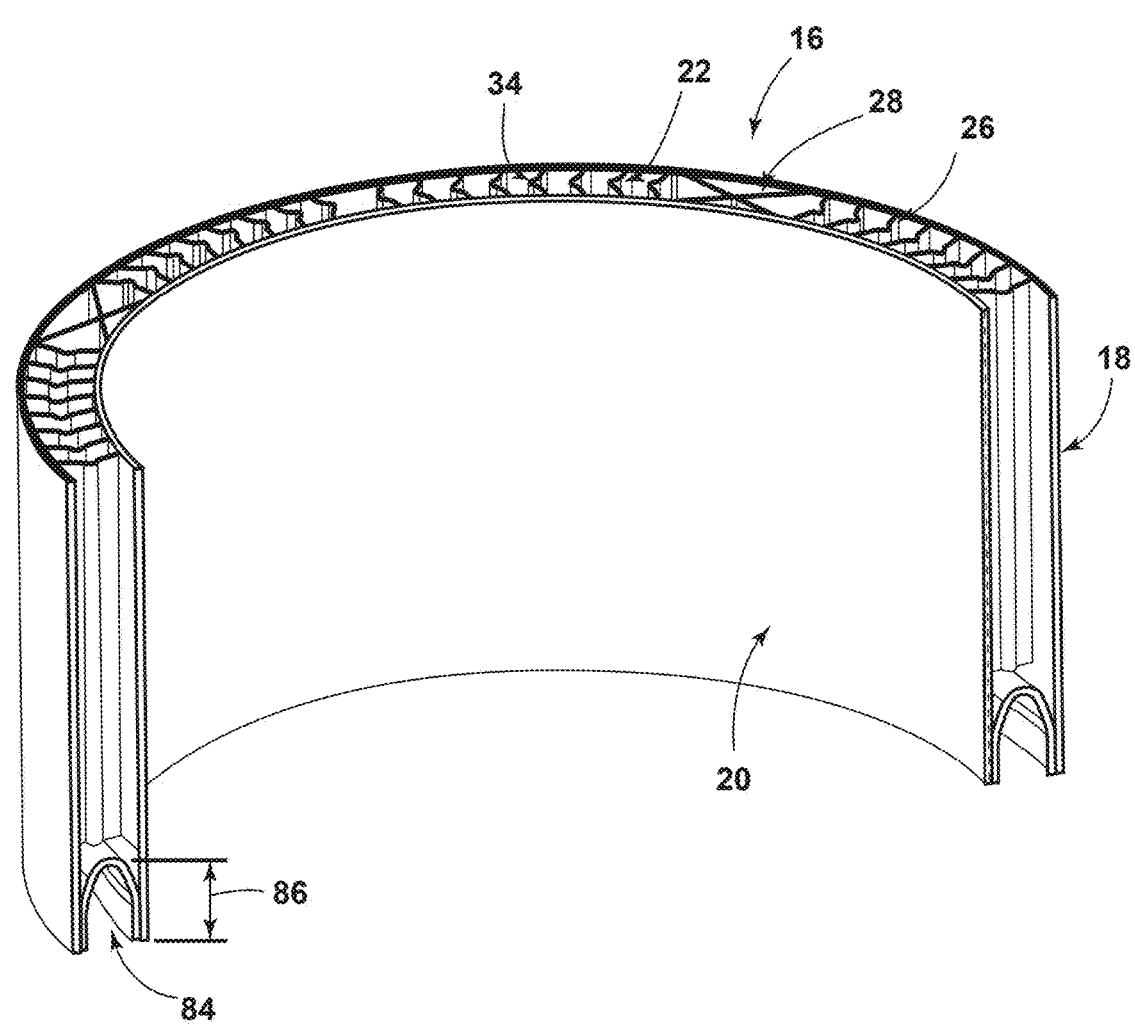
FIGS. 10A and 10B illustrate the hybrid pad system having a sealing region in accordance with various aspects of the present disclosure.
Figure 10B:
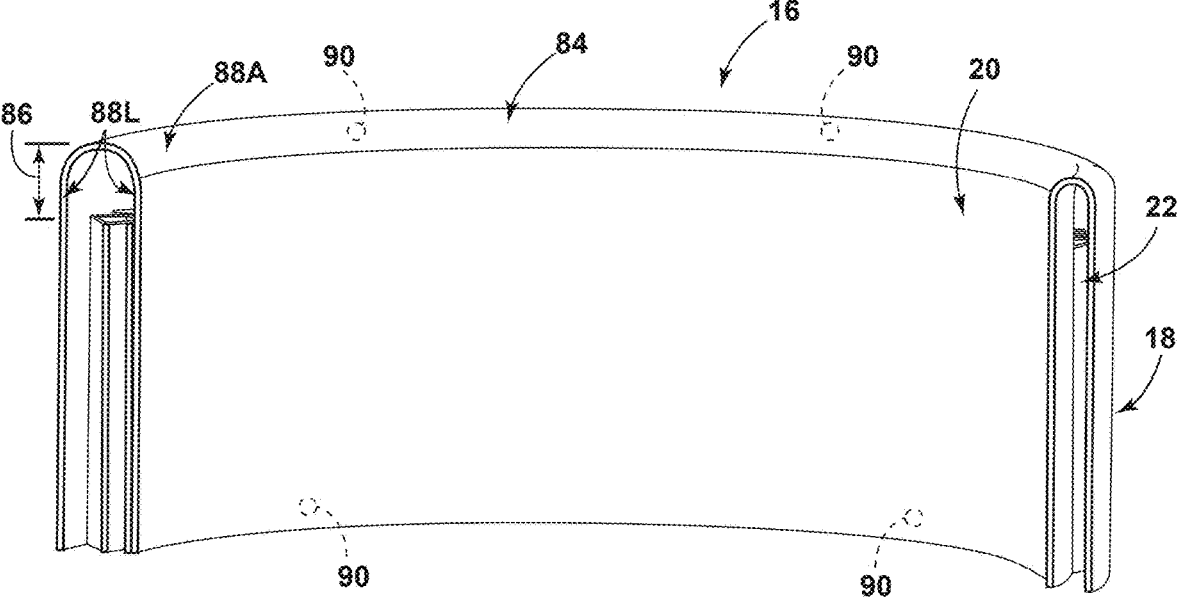

Referring now to FIGS. 10A and 10B, in some examples, the hybrid pad system 16 may further include a sealing region 84 that can control and/or affect eject gas flow during an eject event. In some examples, such as those illustrated in FIGS. 10A and 10B, the sealing region 84 may be positioned between the inner sheet 20 and the outer sheet 18 and may contact an axial end portion of the resilient structure 22. Additionally or alternatively, in some cases, such as the example illustrated in FIG. 10B, the sealing region 84 may be separated from the resilient structure 22 between the inner sheet 20 and the outer sheet 18.

As illustrated in FIG. 10A, the sealing region 84 may extend internally of the outer sheet 18, the inner sheet 20, and/or the resilient structure 22 in an axial direction to operably couple or seal the outer sheet 18 with the inner sheet 20. As shown, the sealing region 84 may define a sealing height 86 in the axial direction that defines a volume between the inner sheet 20 and the outer sheet 18, which may be separated from the resilient structure 22 by the sealing region 84. In the example illustrated in FIG. 10A, when present, eject gases may be separated from the resilient structure 22 due to the sealing region 84. In such cases, the presence of the eject gas within the sealing volume may alter a force-deflection curve of the hybrid pad system 16. As such, the design of the resilient structure 22 may be determined based on a combination of the resilient structure 22, the changes in characteristics based on the presence of the eject gas within the sealing volume, the support 56, and/or other factors. In some instances, when the sealing region 84 is positioned in a lower section of the hybrid pad system 16, an axial compression or axial buckling load may be created on the inner sheet 20 of the hybrid pad system 16, such as during intervals when the sealing region 84 may be pressurized by eject gases associated with a missile launch. Moreover, the hybrid pad system 16 may include an embedded support 56 to mitigate or prevent local buckling.

As illustrated in FIG. 10B, the sealing region 84 may extend externally from the outer sheet 18, the inner sheet 20, and/or the resilient structure 22 in an axial direction to operably couple or seal the outer sheet 18 with the inner sheet 20. As shown, the sealing region 84 may define a sealing height 86 in the axial direction that defines a volume between the resilient structure and the sealing region. In some instances, the scaling height may be determined by the maximum radial displacement expected on the "tension side" (i.e., the "wide-gap" side) of the hybrid pad system 16. For instance, a length of the legs 88L and a length of the arc 88A of the sealing region 84 are sized to retain/allow a half-toroid (perhaps with shorter legs 88L) at the maximum gap. As such, as the gap increases from nominal due to radial displacement of the payload, the scaling region 84 develops a larger radius by "borrowing" some of the vertical lengths of the legs 88L (and the top of the sealing region 84 moves downward axially compared to the nominal position). In some instances, if there was no vertical length of the legs 88L in the nominal position, the sealing region 84 may flatten to a less desirable "flatter arc" shape that may increase stress in the sealing region 84 at that location. Conversely, on the narrow-gap side, the sealing region 84 is compressed, and the nominal radius of the half-toroid may be reduced, some of the length of the arc 88A then transitions into longer "vertical legs," (as the sealing region 84 is constrained between the launcher housing 14 (FIG. 1) and the payload 12 (FIG. 1)). In some instances, the vertical legs 88L may be sized to permit a defined stress state for the sealing region 84 (e.g., the size of the legs 88L and the size of the arc 88A are configured to allow a full semicircle half-toroid radius in each state).

In the example illustrated in FIG. 10B, when present, eject gases may be disposed within the hybrid pad system 16, such as any open area between the inner sheet 20 and the outer sheet 18. As such, the eject gas may be present within the resilient structure 22. In such cases, the presence of the eject gas may alter a force-deflection curve of the hybrid pad system 16. In such instances, the design of the resilient structure 22 may be determined based on a combination of the resilient structure 22, the changes to the resilient structure 22 based on the presence of the eject gas, the support 56, and/or other factors. In various examples, a more uniform load distribution in the hybrid pad system 16 may be created when positioning the sealing region 84 as shown in FIG. 10B compared to the sealing region 84 illustrated in FIG. 10A. Moreover, the hybrid pad system 16 may be free of a support 56, but may capture high-pressure eject gases and, thus, may be more likely to create more normal load and, consequently, axial friction on the payload 12 during an eject event. As such, in instances in which this occurrence may be a concern for a particular launcher and payload 12, the inner sheet may define vent holes 90 and/or the example shown in FIG. 10B may be utilized in an uppermost launcher seal location where pressures may be lower as a launcher may contain five or more seals, in some examples.

Referring now to FIG. 11, a flow diagram for manufacturing a payload assembly according to various examples of the present disclosure is illustrated. In general, the method 200 will be described herein with reference to the hybrid pad system illustrated in FIGS. 1-10B. However, it should be appreciated that the disclosed method 200 may be implemented with hybrid pad systems having any other suitable configurations. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

In some instances, manufacturing the payload assembly can include injection molding or casting a hybrid pad system with the use of an injection molding machine or for launcher system materials, casting machinery to mix and dispense thermosetting materials. In such instances, the injection molding machine can have a granular feedstock material injection wherefrom the feedstock material is conveyed towards an injection gate of the injection molding machine, e.g., using a conveyor screw or plunger. On its way to the injection gate, the feedstock material can pass through a heating section so that it melts and can be injected under high pressure into the injection mold. The molten feedstock material can be injected in a shot, which is the volume needed to fill the molding cavity, compensate for shrinkage, and provide a cushion to transfer pressure from the conveyor system to the molding cavity. When enough material has gathered at the injection gate, the molten plastic is forced at high pressure and high velocity to run along sprue bushings/runners into the one or more cavities of the injection mold. The molding cavities of the injection mold are defined between an injector mold plate, or tool, and a closely contacting opposite ejector mold plate, or core, that together delimit one or more molding cavities and confine the injected volume of melted plastic. The injection mold with its molding cavities is at a temperature below the solidification temperature of the plastic material injected. Pressure is maintained until the sprue at the injection gate solidifies so that no more material can enter the one or more cavities. Then the screw or ram of the conveyer system reciprocates the same distance as the screw or ram traveled forward when filling the one or more molding cavities and acquires plastic material for the next cycle while the plastic material within the mold cools and solidifies so that it can be ejected in a dimensionally stable state.

In examples in which the hybrid pad system is formed through injection molding, at (202), the method 200 may include placing an injector mold plate of a mold assembly in a defined position relative to an ejector mold plate to define an injection mold. At (204), the method 200 can include moving one or more corebars within the mold assembly along a common translational axis. Moreover, at (206), the method 200 can include positioning a support within the mold assembly before injecting the material between the tool and the core. Additionally or alternatively, the support may be adhered to the inner sheet, and/or any other portion of the hybrid pad system after the forming of the outer sheet, the inner sheet, and/or the resilient structure. In some cases, the support can be configured as a preformed material formed from at least one of a metallic material, an elastomeric material, a polymeric material, or a synthetic material. Additionally or alternatively, the support can be configured as a thicker region along the inner sheet compared to the one or more web elements.

At (208), the method can include injecting a material between the tool and the core to form an outer sheet, an inner sheet, and a resilient structure positioned between the outer sheet and the inner sheet. As provided herein, the resilient structure 22 can include one or more web elements 28 within one or more web regions and/or one or more restoring elements (such as the struts described herein) within one or more restoration regions. The web regions and the restoration regions may be interspersed with one another within the resilient structure 22.

At (210), the method 200 can include applying a layer to the inner sheet and/or the support. The layer may be configured to reduce an amount of friction between a payload and the inner sheet.

At (212), the method 200 can include adhering at least a section of the outer sheet to a launch tube and positioning the outer sheet, the inner sheet, and the resilient structure around a payload. In various instances, the outer sheet may define attached sections in which the outer sheet and the surrounding housing are adhered or otherwise attached to one another. In some instances, the attached sections may be generally aligned with the web regions of the resilient structure. In addition, the outer sheet may define unattached sections in which the outer sheet and the surrounding housing are not adhered to or otherwise attached to one another. In some instances, the unattached sections may generally be aligned with the restoration regions of the resilient structure. In some cases, by having intermittent attached sections and unattached sections, the use of a high modulus support and stiff compressive elements may be utilized while minimizing peak strains that would otherwise occur with straightening and stretching of the buckled struts. In some cases, various portions of the hybrid pad system may be notched or cut open in order to allow for various features attached to the payload to pass therealong and/or therethrough. As such, the hybrid pad system may include various features as part of the outer sheet envelope, such as a hydraulic line or electrical conduit mounted to the surrounding housing that may require a local modification or cut-out to the hybrid pad system.

Referring now to FIG. 12, a flow diagram for assembling a payload assembly according to various examples of the present disclosure is illustrated. In general, the method 300 will be described herein with reference to the hybrid pad system illustrated in FIGS. 1-10B. However, it should be appreciated that the disclosed method 300 may be implemented with hybrid pad systems having any other suitable configurations. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

In some instances, manufacturing the payload assembly can include additively manufacturing the shock assembly system. Additive manufacturing is utilized to fabricate 3-dimensional (3D) parts or products by adding a layer-upon-layer of material. Additive manufacturing utilizes 3D modeling (Computer-Aided Design or CAD) software, computer-controlled additive-manufacturing equipment, and raw materials in powder or liquid form. Additive manufacturing encompasses a wide variety of technologies and incorporates a wide variety of techniques, such as, for example, laser freeform manufacturing (LFM), laser deposition (LD), direct metal deposition (DMD), laser metal deposition, laser additive manufacturing, laser engineered net shaping (LENS), stereolithography (SLA), selective laser sintering (SLS), fused deposition modeling (FDM), multi-jet modeling (MJM), 3D printing, rapid prototyping, direct digital manufacturing, layered manufacturing, and additive fabrication.

In examples in which the hybrid pad system is formed through casting, at (302), the method 200 can include positioning a support within the mold assembly before injecting the material between the tool and the core. Additionally or alternatively, the support may be adhered to the inner sheet, and/or any other portion of the hybrid pad system after the forming of the outer sheet, the inner sheet, and/or the resilient structure. In some cases, the support can be configured as a preformed material formed from at least one of a metallic material, an elastomeric material, a polymeric material, or a synthetic material. Additionally or alternatively, the support can be configured as a thicker region along the inner sheet compared to the one or more web elements.

At (304), the method 300 can include additively forming an outer sheet, an inner sheet, and a resilient structure positioned between the outer sheet and the inner sheet. As provided above, the outer sheet, the inner sheet, and the resilient structure may be formed through any practicable additive manufacturing technology.

At (306), the method 300 can include applying a layer to the inner sheet and/or the support. The layer may be configured to reduce an amount of friction between a payload and the inner sheet.

At (308), the method 300 can include adhering at least a section of the outer sheet to a launch tube and positioning the outer sheet, the inner sheet, and the resilient structure around a payload. As provided herein, in various instances, the outer sheet may define attached sections in which the outer sheet and the surrounding housing are adhered or otherwise attached to one another. In some instances, the attached sections may be generally aligned with the web regions of the resilient structure. In addition, the outer sheet may define unattached sections in which the outer sheet and the surrounding housing are not adhered to or otherwise attached to one another. In some instances, the unattached sections may generally be aligned with the restoration regions of the resilient structure. In some cases, by having intermittent attached sections and unattached sections, the use of a high modulus support and stiff compressive elements may be utilized while minimizing undesirable force/deflection curve contributions that would otherwise occur with straightening and stretching of the buckled struts. In some cases, various portions of the hybrid pad system may be notched or cut open in order to allow for various features attached to the payload to pass therealong and/or therethrough.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A hybrid pad system positioned between a missile and a launch tube, the hybrid pad system comprising:
   an outer sheet;
   an inner sheet spaced from the outer sheet; and
   a resilient structure positioned between the outer sheet and the inner sheet, the resilient structure comprising:
      one or more web regions each including a first web element coupled with the outer sheet and the inner sheet and a second web element coupled with the outer sheet and the inner sheet, wherein the first web element intersects the second web element at an intersection point between the outer sheet and the inner sheet; and
      one or more restoration regions each including one or more buckled struts coupled with the outer sheet and the inner sheet, wherein the one or more restoration regions are circumferentially offset from the one or more web regions.

2. The hybrid pad system of claim 1, wherein the first web element is operably coupled with the outer sheet at a first contact point and the inner sheet at a second contact point, and wherein the first contact point is circumferentially offset from the second contact point about a common axis of the outer sheet and the inner sheet by a first tangential angle.

3. The hybrid pad system of claim 1, wherein the one or more buckled struts are operably coupled with the outer sheet at a third contact point and the inner sheet at a fourth contact point.

4. The hybrid pad system of claim 3, wherein the third contact point is circumferentially offset from the fourth contact point about a common axis of the outer sheet and the inner sheet by a second tangential angle, the second tangential angle being less than the first tangential angle.

5. The hybrid pad system of claim 1, wherein the one or more buckled struts within each of the one or more restoration regions includes a first group of one or more buckled struts oriented in a first direction and a second group of one or more buckled struts oriented in a second, opposing direction.

6. The hybrid pad system of claim 1, wherein the one or more buckled struts include a knee section positioned between a pair of opposing leg sections.

7. The hybrid pad system of claim 1, further comprising:
a support operably coupled with the inner sheet.

8. The hybrid pad system of claim 7, further comprising:
a layer positioned on one of the support or the inner sheet and configured to reduce an amount of friction between the missile and the inner sheet.

9. The hybrid pad system of claim 6, wherein the knee section defines a semicircular shape.

10. The hybrid pad system of claim 6, wherein the knee section is configured to bend before movement of the opposing leg sections when the one or more buckled struts is compressed.

11. A method of manufacturing a hybrid pad system, the method comprising:
placing an injector mold plate of a mold assembly in a defined position relative to an ejector mold plate to define an injection mold;
forming an outer sheet, an inner sheet, one or more web regions of a resilient structure, and one or more restoration regions of the resilient structure by injecting a material between the injector mold plate and the ejector mold plate, wherein the one or more web regions each include a first web element coupled with the outer sheet and the inner sheet and a second web element coupled with the outer sheet and the inner sheet, wherein the first web element intersects the second web element at an intersection point between the outer sheet and the inner sheet, wherein one or more restoration regions each including one or more buckled struts coupled with the outer sheet and the inner sheet, and wherein the one or more restoration regions are circumferentially offset from the one or more web regions; and
adhering an attached section of the outer sheet to a launch tube, the attached section circumferentially adjacent to an unattached section.

12. The method of claim 11, further comprising:
applying a layer to the inner sheet and configured to reduce an amount of friction between a payload and the inner sheet.

13. The method of claim 12, further comprising:
positioning a support within the mold assembly before injecting the material between the injector mold plate and the ejector mold plate.

14. The method of claim 13, wherein the support is configured as a preformed material formed from at least one of a metallic material, an elastomeric material, a polymeric material, or a synthetic material.

15. The method of claim 11, further comprising:
positioning the outer sheet, the inner sheet, and the resilient structure around a payload.

16. A hybrid pad system positioned between a missile and a launch tube, the hybrid pad system comprising:
an outer sheet;
an inner sheet spaced from the outer sheet;
a web region positioned between the outer sheet and the inner sheet, wherein the web region includes a first web element and a second web element, and wherein the first web element intersects the second web element at an intersection point between the outer sheet and the inner sheet;
a restoration region positioned between the outer sheet and the inner sheet and tangentially offset from the web region, wherein the restoration region includes one or more buckled struts extending between the outer sheet and the inner sheet, and wherein the one or more buckled struts are circumferentially offset from the first web element and the second web element; and
a support operably coupled with the inner sheet.

17. The hybrid pad system of claim 16, wherein the support is configured as a preformed material formed from at least one of a metallic material, an elastomeric material, a polymeric material, or a synthetic material.

18. The hybrid pad system of claim 16, wherein the first web element is operably coupled with the outer sheet at a first contact point and the inner sheet at a second contact point, and wherein the first contact point is circumferentially offset from the second contact point about a common axis of the outer sheet and the inner sheet by a first tangential angle.

19. The hybrid pad system of claim 18, wherein the one or more buckled struts are operably coupled with the outer sheet at a third contact point and the inner sheet at a fourth contact point.

20. The hybrid pad system of claim 19, wherein the third contact point is circumferentially offset from the fourth contact point about the common axis of the outer sheet and the inner sheet by a second tangential angle, the second tangential angle being less than the first tangential angle.

* * * * *